United States Patent
Ng et al.

(10) Patent No.: US 6,829,406 B2
(45) Date of Patent: Dec. 7, 2004

(54) METHOD AND SYSTEM FOR DETERMINING LOCATION AND VALUE OF DISPERSION COMPENSATING MODULES IN AN OPTICAL NETWORK

(75) Inventors: Eddie Kai Ho Ng, Ottawa (CA); Colin Geoffrey Kelly, Ottawa (CA); Peter Steven Pieda, Ottawa (CA)

(73) Assignee: Tropic Networks Inc., Kanata (CA)

( * ) Notice: Subject to any disclaimer, the term of this patent is extended or adjusted under 35 U.S.C. 154(b) by 216 days.

(21) Appl. No.: 10/273,858

(22) Filed: Oct. 21, 2002

(65) Prior Publication Data

US 2004/0008929 A1 Jan. 15, 2004

Related U.S. Application Data

(60) Provisional application No. 60/402,558, filed on Aug. 12, 2002, and provisional application No. 60/394,531, filed on Jul. 10, 2002.

(51) Int. Cl.[7] .................................................. G02B 6/28
(52) U.S. Cl. ............................. 385/24; 398/29; 398/81; 359/615
(58) Field of Search .............................. 385/24; 398/25, 398/28, 29, 34, 79, 81, 147–150, 158–161; 359/337.5, 338, 339, 615

(56) References Cited

U.S. PATENT DOCUMENTS

| | | | |
|---|---|---|---|
| 5,559,920 A | | 9/1996 | Chraplyvy et al. |
| 6,266,170 B1 | * | 7/2001 | Fee .............................. 398/147 |
| 6,515,779 B2 | * | 2/2003 | Fee .............................. 398/147 |
| 6,724,997 B2 | * | 4/2004 | Oksanen ...................... 398/150 |
| 2002/0093706 A1 | | 7/2002 | Lu et al. |
| 2003/0099014 A1 | * | 5/2003 | Egner et al. ................. 359/124 |
| 2003/0180042 A1 | * | 9/2003 | Nelles et al. ................. 398/27 |
| 2004/0028373 A1 | * | 2/2004 | Ng .............................. 385/147 |

OTHER PUBLICATIONS

Chrotowski, L., et al, "Optical Network Design of a Metro Ring", University of California at Berkeley, Dec. 17, 2001.

* cited by examiner

*Primary Examiner*—Akm Enayet Ullah
*Assistant Examiner*—Michelle R. Connelly-Cushwa
(74) *Attorney, Agent, or Firm*—Victoria Donnelly

(57) ABSTRACT

A method and system for determining location and value of dispersion compensating modules (DCMs) in an optical network is provided. The method comprises evaluating possible DCM values and locations and successively adding selected combinations to the network until the dispersion limits of the network are met. This systematic method is applicable to a variety of network topologies. In one embodiment, the method for determining the location and value of the DCMs uses the amount of compensated effective dispersion over all lightpaths that pass through the DCM to select the combinations. In another embodiment, the method is repeated a number of times with different selections of DCM value and location combinations, and the method providing the least number of DCMs and the lowest DCM values is chosen.

23 Claims, 5 Drawing Sheets

| Lightpath 16 | Lightpath ID 32 | Fiber IDs 34 | Effective Dispersion 36 |
|---|---|---|---|
| AC | 1 | 1, 2 | 0 |
| AD | 3 | 1,2,3 | 20 |
| BD | 5 | 2,3 | 0 |
| BE | 7 | 2,3,4 | 30 |
| DF | 9 | 4,5 | 10 |
| DG | 11 | 4,5,6 | 50 |
| EA | 13 | 5,6,7 | 30 |

| DCM value 42 | DCM location 44 | Lightpath IDs 46 | Effectiveness Score 48 | Validity Status 49 |
|---|---|---|---|---|
| 40 | 1 | 1, 3 | 0 | valid |
| 60 | 1 | 1, 3 | 0 | valid |
| 80 | 1 | 1, 3 | 0 | valid |
| 40 | 2 | 1, 3, 5, 7 | 0 | valid |
| 60 | 2 | 1, 3, 5, 7 | 0 | valid |
| 80 | 2 | 1, 3, 5, 7 | 0 | valid |
| 40 | 3 | 3, 5, 7 | 0 | valid |
| 60 | 3 | 3, 5, 7 | 0 | valid |
| 80 | 3 | 3, 5, 7 | 0 | valid |
| 40 | 4 | 7, 9, 11 | 0 | valid |
| 60 | 4 | 7, 9, 11 | 0 | valid |
| 80 | 4 | 7, 9, 11 | 0 | valid |
| 40 | 5 | 9, 11, 13 | 0 | valid |
| 60 | 5 | 9, 11, 13 | 0 | valid |
| 80 | 5 | 9, 11, 13 | 0 | valid |
| 40 | 6 | 11, 13 | 0 | valid |
| 60 | 6 | 11, 13 | 0 | valid |
| 80 | 6 | 11, 13 | 0 | valid |
| 40 | 7 | 13 | 0 | valid |
| 60 | 7 | 13 | 0 | valid |
| 80 | 7 | 13 | 0 | valid |

METHOD AND SYSTEM FOR DETERMINING LOCATION AND VALUE OF DISPERSION COMPENSATING MODULES IN AN OPTICAL NETWORK

RELATED APPLICATIONS

This application claims benefit of U.S. Provisional Patent Application to Ng et al. entitled "Method for Determining Location and Value of Dispersion Compensation Module (DCM) in an Optical Network", Ser. No. 60/394,531 filed on Jul. 10, 2002; and second Provisional Patent Application to Ng et al. entitled "Method for Determining Location and Value of Dispersion Compensation Module (DCM) in an Optical Network", Ser. No. 60/402,558 filed on Aug. 12, 2002.

FIELD OF THE INVENTION

The present invention relates generally to optical networks, and in particular to a method and system for determining location and value of dispersion compensating modules (DCMs) in optical networks.

BACKGROUND OF THE INVENTION

As development of long-haul networks begins to saturate and the demand for larger bandwidth in the networks starts to expose bottlenecks at the user-end, the focus of optical network development has shifted away from long-haul networks to smaller and more dynamic networks, for example metropolitan area networks (MANs). As a result, new network design and planning rules, for example related to the placement of network components, have to be developed.

Specifically, determining the location and value of dispersion compensating modules (DCMS) in MANs is a new design issue that has arisen since the growth in the size of MANs has reached the degree that dispersion compensation has become necessary in MANs. However, many of the current DCM design methods were developed for long-haul networks and may not always be appropriate for MANs.

For example, long-haul networks are subject to fiber nonlinear effects due to high signal power levels required for transmission over long spans of fiber, and DCMs are often used to counter these nonlinear effects while eliminating chromatic dispersion, as illustrated by the following two patent documents. U.S. Pat. No. 5,559,920 to Chraplyvy et al. issued Sep. 24, 1996 and entitled "Dispersion Compensation in Optical Fiber Communications", discloses a method of placing dispersion compensating fiber (DCF) in a long-haul network whereby the dispersion of the signals in the network is always limited to the linear regime by implementing "dispersion averaging". Another U.S. patent application 20020093706 to Lu et al. dated Jul. 18, 2002 and entitled "Dispersion Managed Optical Transmission for Wavelength Division Multiplexed Systems" discloses a method of selecting DCM values to minimize nonlinear effects such as self-phase modulation, inter-symbol interference, and cross-phase modulation, while minimizing chromatic dispersion.

MANs, on the other hand, have lower signal power levels than long-haul networks so that fiber nonlinearity is typically not an issue, and therefore it is not always necessary to attempt to minimize non-linear effects when determining the location and value of DCMs in an optical MAN.

In the above-mentioned patent documents, as in most methods for DCM design of long-haul networks, the dispersion compensation is performed on a per-span basis so that a DCM is placed on each fiber span in the network. In contrast, it is inefficient and costly for DCMs to be placed on every fiber span in a MAN, and because MANs are more cost-sensitive than long-haul networks, minimizing the total number of DCMs in the network is the motivating factor in DCM design methods for MANs.

Currently, there are existing methods for determining the location and value of DCMs in a MAN whereby DCMs are placed on only a selected number of fiber spans in the network. These methods are performed manually using the intuition and experience of a designer.

An optical university project by L. Chrotowski, C. Mateus, F. Mo, and L. Zhou at the University of California, Berkeley dated Dec. 17, 2001 and entitled "Optical Network Design of a Metro Ring" discloses a method of DCM design in a metro ring network involving quantifying the degree of eye closure on a signal, which is used as the factor upon which the DCM placement is dependent. The placement itself however is determined heuristically by the designers, who attempt to minimize the total number of DCMs in the network by determining placement of just enough DCMs so that the network is operating within desired conditions (in this case to a maximum value of eye closure).

However, real-world MANs are topologically complex and often take the form of rings or meshes that may include coupled lightpaths. With increasing size and complexity of MANs, the current manual, heuristic methods of DCM placement become impractical and inefficient.

Therefore, there is a need in the industry for the development of a systematic method and system for determining the location and value of DCMs in an optical network that would be efficient and applicable to a variety of network topologies.

SUMMARY OF THE INVENTION

Therefore there is an object of the invention to provide a method and system for determining the location and value of DCMs in an optical network that would avoid or minimize the above-mentioned drawbacks.

According to one aspect of the invention, there is provided a method for determining the location and value of one or more DCMs in an optical network, comprising the steps of:

(a) determining a lightpath topology in the network;

(b) determining an effective dispersion on each of the lightpaths in the network, the effective dispersion being an amount of dispersion accumulated along the lightpath which exceeds the maximum positive dispersion value Pos_Disp_ Limit specified for the network;

(c) if the effective dispersion is positive, calculating an effectiveness score for each combination of a DCM value and location in the network, the effectiveness score being a measure of dispersion compensation by the DCM over one or more lightpaths that pass through the DCM;

(d) selecting the DCM location and value combination based on said effectiveness scores; and (e) repeating the steps (b) to (d) until the effective dispersion in the network is substantially zero.

Conveniently, the step of determining the lightpath topology comprises identifying all lightpaths in the network including protection lightpaths and reconfigurable lightpaths.

In the method of the first embodiment of the invention, the step (d) of selecting the DCM location and value combination may comprise selecting the DCM location and value combination whose DCM calculation object has the highest effectiveness score.

The step (b) of determining the effective dispersion may comprise measuring the effective dispersion in units of distance.

The step (a) of determining the lightpath topology may comprise:

identifying lightpaths in the network;

assigning lightpath identification numbers (lightpath IDs) to the lightpaths;

identifying fiber spans over which the lightpaths are laid.

Furthermore, the step (c) of calculating the effectiveness score may comprise summing the effectiveness scores of each lightpath that passes through the DCM, wherein the effectiveness score for a lightpath is equal to:

the effective dispersion on the lightpath, if the effective dispersion is less than the DCM value; and the DCM value, if the effective dispersion on the lightpath is greater than the DCM value.

Also, the method may further comprise the step of introducing a DCM calculation object and initializing the values thereof for each combination of a DCM value and location, the calculation object including the following components:

lightpath identification numbers (lightpath IDs) of lightpaths that pass through the DCM;

a validity status, indicating the permission for placing the DCM in the specified location in the network;

an effectiveness score, providing a measure of dispersion compensation by the DCM over one or more lightpaths that pass through the DCM.

Additionally, the step of calculating the effectiveness score may comprise:

(i) selecting the DCM calculation object;

(ii) verifying if the accumulated dispersion along a lightpath that passes through the DCM is above the maximum negative dispersion value Neg_Disp_Limit specified for the network;

(iii) if no, updating the validity status to be "invalid";

(iv) if yes, re-calculating the effectiveness score by taking into account the values and locations of the selected DCMs; and (v) repeating the steps (i) to (iv) until all DCM calculation objects are selected.

The step of introducing the DCM calculation object may comprise defining the validity status as a Boolean variable having values of "valid" and "invalid" and indicating permission for placing the DCM in the specified location in the network, the Boolean variable being "valid" if the accumulated dispersion along each of the lightpaths passing through the DCM is above the maximum negative dispersion value Neg_Disp_Limit specified for the network.

Also, the step of introducing the DCM calculation object may comprise defining the validity status as the number of remaining DCMs permitted to be placed at the DCM location.

In a modification to the method of the first embodiment of the invention, the step (c) of calculating the effectiveness score comprises calculating the effectiveness score by taking into account a dispersion slope mismatch between the dispersion of fiber spans in the network and the dispersion of the DCM.

The step of calculating the effectiveness score by taking into account a dispersion slope mismatch may comprise calculating the effectiveness score as equal to the minimum compensated dispersion over all wavelengths for lightpaths that pass through the DCM.

In another modification to the method of the first embodiment of the invention, the step (d) of selecting the DCM location and value combination further comprises determining alternative DCM locations such that the transfer of the DCM to the alternative location does not change the accumulated dispersion along any lightpath in the network.

According to another aspect of the invention, there is provided a method for determining the location and value of one or more dispersion compensating modules (DCMs) in an optical network, comprising the steps of:

(g) executing the method as described in claim 1, wherein the step (d) of selecting the DCM location and value combination comprises selecting the DCM location and value combination whose DCM calculation object is chosen from the DCM calculation objects in the network;

(h) repeating the step (g) required number of times; and (k) comparing the total numbers and values of DCMs provided by methods executed in steps (g) to (h); and (l) choosing the method among methods executed in steps (g) to (h) that provides the least number of DCMs and the lowest value of DCMs in the network.

The method may further comprise saving all calculated values. Also, the step (h) may comprise repeating the step (g) for the DCM calculation object, which has the highest effectiveness score.

Additionally, the step (g) of executing the method may comprise selecting the DCM location and value combination whose DCM calculation object is chosen from a subset of the DCM calculation objects. Beneficially, the subset of DCM calculation objects may be the subset with the highest effectiveness scores.

Furthermore, the step (d) of selecting the DCM value and location combination may further comprise verifying that the total number of selected DCM value and location combinations is less than that of previous executions of the step (g), otherwise terminating the execution of the step (g).

According to yet another aspect of the invention, there is provided a system for determining the location and value of one or more dispersion compensating modules (DCMs) in an optical network, comprising:

(a) means for determining a lightpath topology in the network, (b) means for determining an effective dispersion on each of the lightpaths in the network, the effective dispersion being an amount of dispersion accumulated along the lightpath, which exceeds the maximum positive dispersion value Pos_Disp_Limit specified for the network;

(c) if the effective dispersion is positive, means for calculating an effectiveness score for each combination of a DCM value and location in the network, the effectiveness score being a measure of dispersion compensation by the DCM over one or more lightpaths that pass through the DCM;

(d) means for selecting the DCM location and value combination based on said effectiveness scores; and (e) means for checking that the effective dispersion in the network is substantially zero.

In a modification to the first embodiment of the invention, the means (c) for calculating the effectiveness score comprises means for calculating the effectiveness score that takes into account a dispersion slope mismatch between the dispersion of fiber spans in the network and the dispersion of the DCM.

In another modification to the first embodiment of the invention, the means (d) for selecting the DCM location and value combination further comprises means for determining alternative DCM locations such that the transfer of the DCM to the alternative location does not change the accumulated dispersion along any lightpath in the network.

The methods for determining the location and value of DCMs in an optical network of the embodiments of the invention provide a systematic procedure that is efficient and applicable to a variety of network topologies.

BRIEF DESCRIPTION OF THE DRAWINGS

Embodiments of the invention will now be described, by way of example, with reference to the accompanying drawings in which.

DETAILED DESCRIPTION OF PREFERRED EMBODIMENTS

Figure 1:
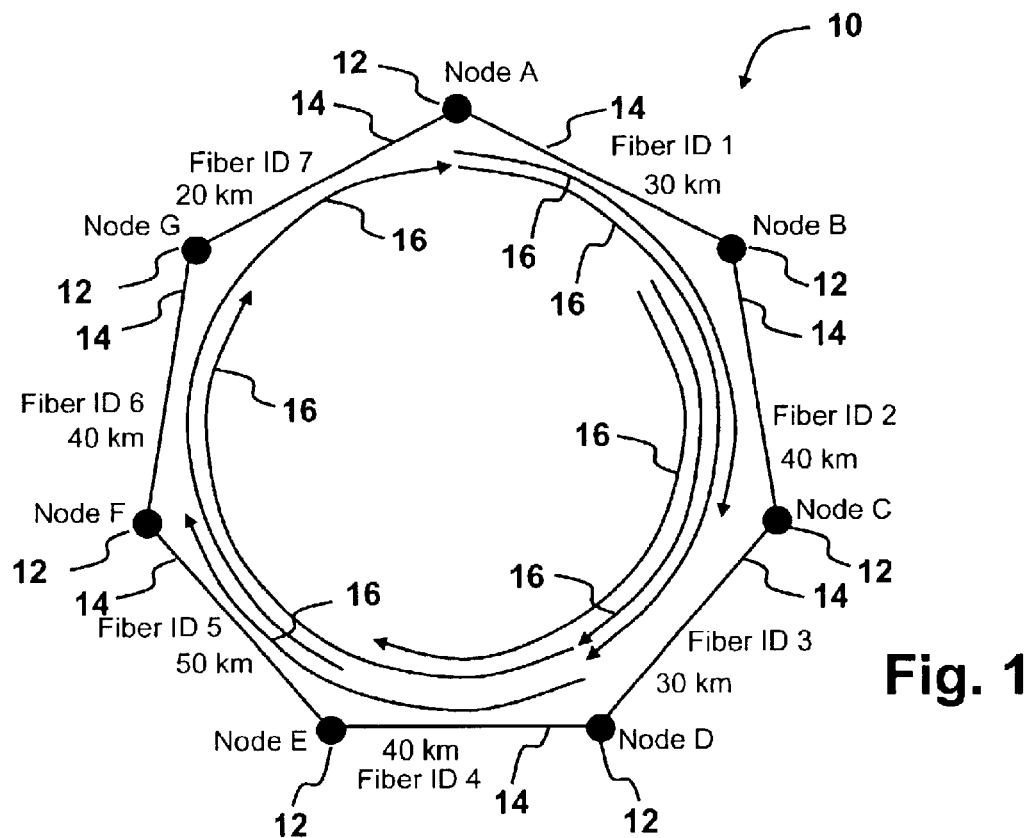
FIG. 1 is an exemplary optical network used for illustrating methods for determining the placement and value of DCMs according to embodiments of the invention.

An exemplary optical network 10 is illustrated in FIG. 1 as comprising a plurality of, in this example seven, nodes 12 identified individually as Nodes "A" through "G" (namely, nodes "A", "B", "C", "D", "E", "F", "G"), which are coupled together via fiber spans 14 identified individually by the fiber identification numbers (IDs) "1" through "7" and represented by straight solid lines. Lightpaths 16 are represented by curved solid lines with arrows indicating the direction of a network signal traveling from a source node to a destination node.

As is known in the art, such an optical network may include an arbitrary number of nodes 12 and lightpaths 16, and each of the fiber spans 14 may have different lengths and thus different dispersions. Also, such an optical network 10 may have other arrangements of nodes 12 and other lightpaths 16 through the nodes 12, such as mesh or star topologies. Accordingly, FIG. 1 serves merely to illustrate one form of optical network for the purpose of describing embodiments of the invention.

Figure 2:
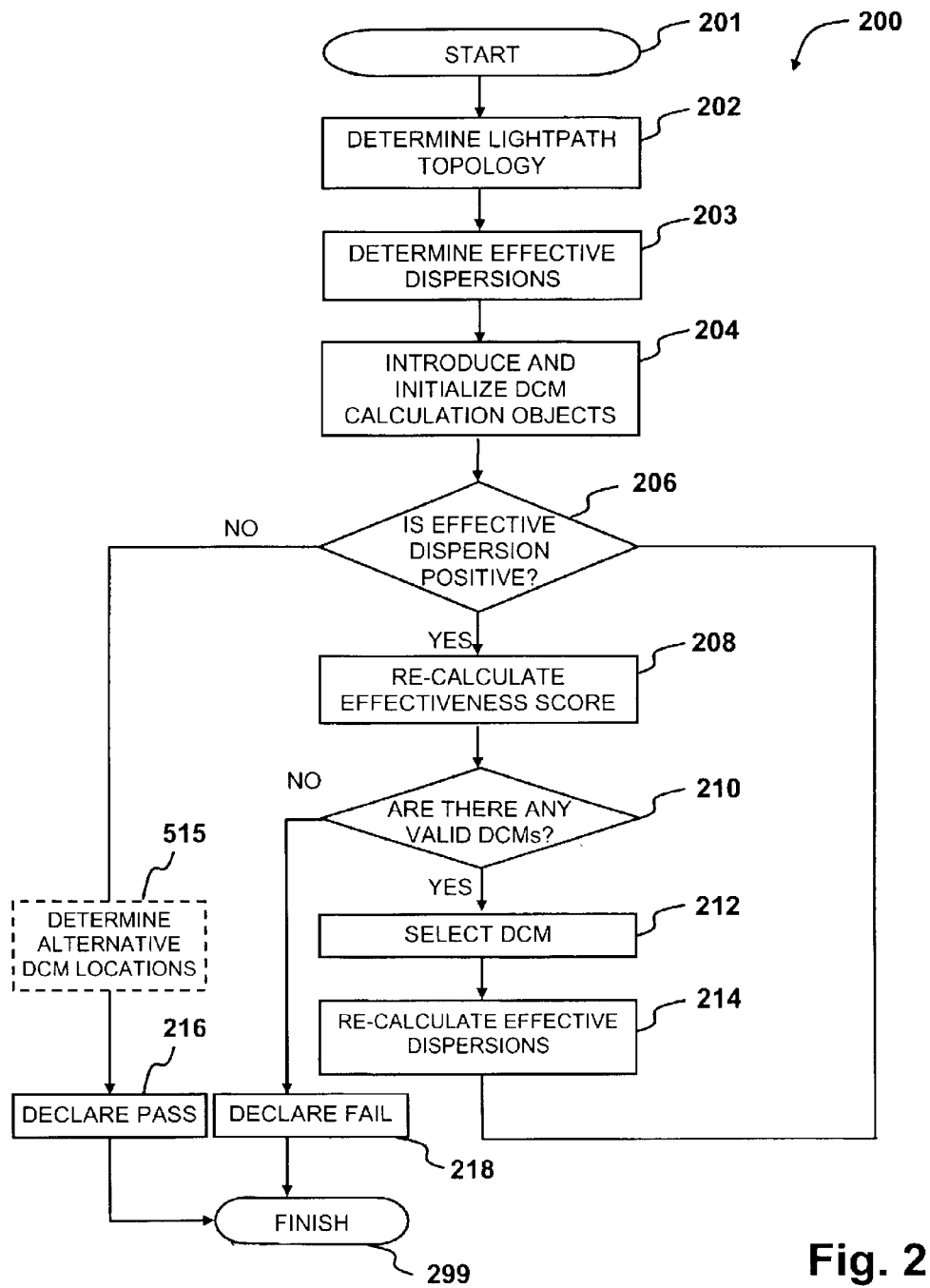
FIG. 2 is a flowchart illustrating the steps of the method for determining the placement and value of DCMs according to a first embodiment of the invention.

FIG. 2 is a flowchart 200 illustrating the steps of the method for determining the location and value of dispersion compensating modules (DCMs) in the optical network 10 according to the first embodiment of the invention.

Figure 2A:
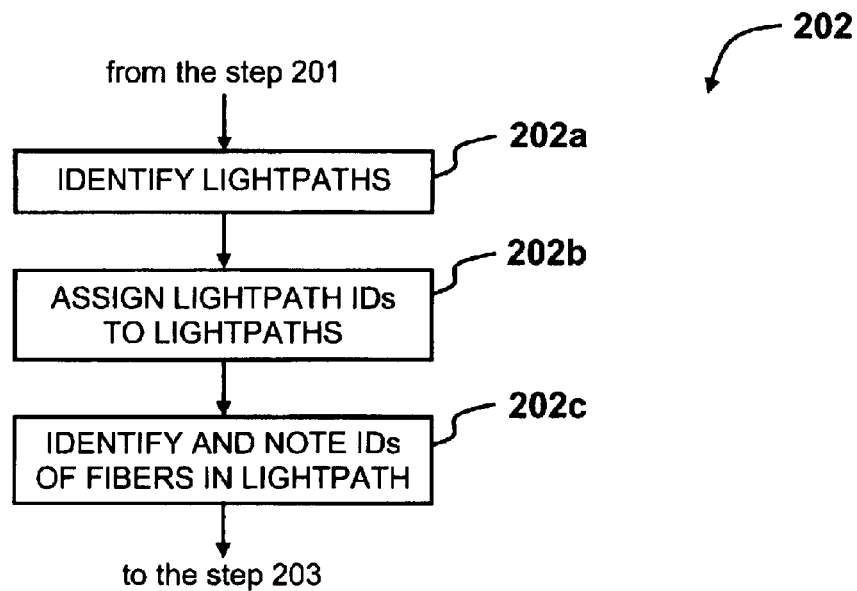
FIG. 2A is a flowchart illustrating the step 202 of determining the lightpath topology of an optical network in the method of FIG. 2 in more detail.

Upon start 201, the procedure 200 determines the lightpath topology of the network (step 202). Determining the lightpath topology (step 202) comprises the steps illustrated in FIG. 2A of identifying each lightpath 16 in the optical network 10 (step 202a), assigning a lightpath identification number (ID) to each lightpath 16 (step 202b), and identifying the fiber spans and noting the fiber IDs of those fiber spans over which each lightpath 16 is laid (step 202c).

After determining the lightpath topology, the flowchart 200 proceeds with determining the effective dispersion along each lightpath 16 (step 203), where the effective dispersion is defined as the amount of dispersion accumulated along the lightpath that exceeds the maximum positive dispersion limit Pos_Disp_Limit of the network. The maximum positive dispersion limit Pos_Disp_Limit is derived from the specified chromatic dispersion limit of the transceivers in the network 10. Dispersion parameters used in the method of FIG. 2, such as effective dispersion and Pos_Disp_Limit may be specified in units of distance, as opposed to units of dispersion, if the dispersion coefficient is constant for all spans of fiber 14 in the network 10, as is the case in the exemplary network 10 of FIG. 1.

Figure 3:
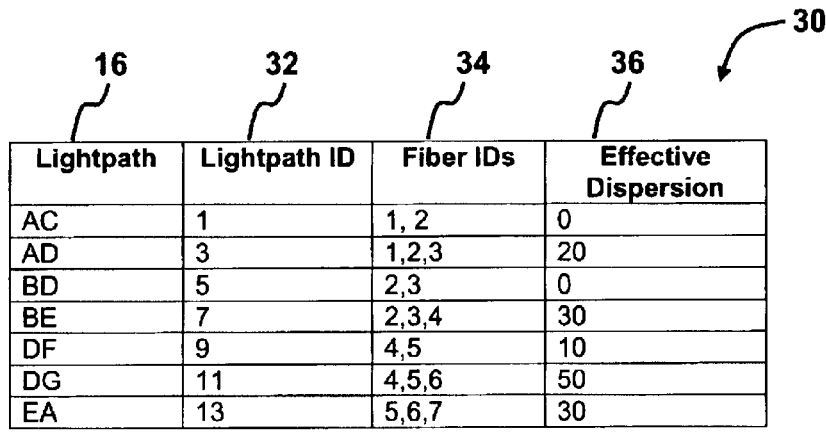
FIG. 3 shows a table summarizing the lightpath topology of the optical network of FIG. 1 determined in the steps 202 and 203 of FIG. 2.

FIG. 3 shows a table 30 summarizing the lightpath topology of the optical network 10 of FIG. 1 determined in the steps 202 and 203 of FIG. 2. Each row in the table 30 corresponds to a lightpath 14 in the network 10 and includes three components: the ID of lightpath, the fiber IDs of the fiber spans over which the lightpath is laid, and the effective dispersion along the lightpath. For example, the second row of the table 30 corresponds to the lightpath "AD" 16. It includes: the lightpath ID "3" 32, the fiber IDs ("1", "2", and "3") of the fiber spans over which the lightpath "AD" is laid 34, and the effective dispersion (20 km) along the lightpath 36. The calculation of the effective dispersion is further detailed in the following paragraph.

In the exemplary network 10 of FIG. 1, the value of Pos_Disp_Limit is 80 km. The amount of dispersion accumulated along the lightpath "AD" is 100 km, and thus the effective dispersion of the lightpath "AD" is the amount of accumulated dispersion exceeding Pos_Disp_Limit, which is 20 km.

After the step 203, the flowchart 200 proceeds with introducing and initializing a DCM calculation object for each of the possible DCM value and location combinations (step 204). The possible DCM locations are each of the fiber spans 14 in the network 10, namely fiber spans with IDs "1" through "7". The possible DCM values are those specified by design. For the exemplary network 10 of FIG. 1, the possible DCM values are "40 km", "60 km", and "80 km"

DCM calculation objects store all information for a particular DCM value and location that is used by the procedure 200 to select DCMs to place in the network 10. Namely, each DCM calculation object includes three components: the IDs of the lightpaths that pass through the DCM location, a validity status, and an effectiveness score.

The purpose of the validity status is to specify whether the DCM value and location combination is a valid addition to the optical network 10. The validity status may, for example, be the remaining number of such DCMs allowed if there is a limitation as to the maximum number of DCMs permitted on each fiber span 14. Alternatively, it may simply be a Boolean variable, having values of "valid" and "invalid" and indicating whether the DCM value and location combination is known to cause over-compensation of dispersion, over-compensation being the amount of accumulated dispersion less than the maximum negative dispersion Neg_Disp_Limit specified for the network that results from the placement of a DCM on the lightpath. In the exemplary network 10 of FIG. 1, the value of Neg_Disp_Limit is −20 km. Over-compensation of dispersion is prohibited and results in the DCM value and location combination that causes over-compensation of dispersion on any lightpath to be "invalid".

The effectiveness score is a measure of the effectiveness of the DCM value and location combination and may be defined as, for example, the effective dispersion that the DCM will compensate on a lightpath, summed over all lightpaths that pass through the DCM location. The effective dispersion that the DCM will compensate on a lightpath is equal to the effective dispersion on the lightpath if the effective dispersion is less than the DCM value, and equal to the DCM value if the effective dispersion on the lightpath is greater than the DCM value.

Figure 2B:
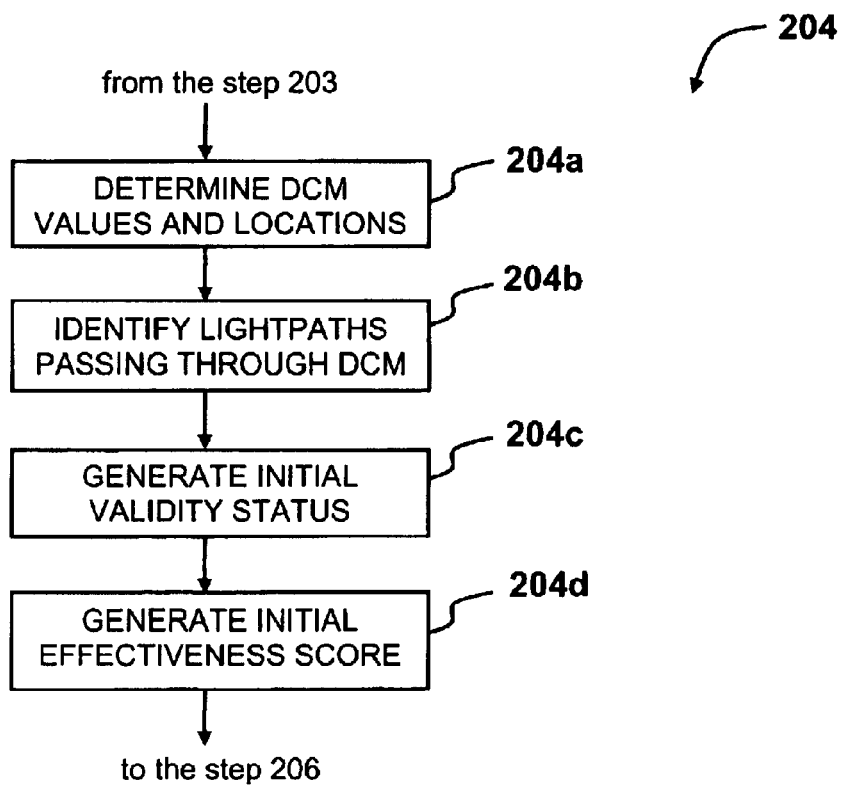
FIG. 2B is a flowchart illustrating the step 204 of introducing and initializing DCM calculation objects in the method of FIG. 2 in more detail.

Constructing the DCM calculation objects (step 204) comprises the steps illustrated in FIG. 2B of determining each possible combination of DCM value and location (step 204a), identifying the lightpaths that travel through each DCM location (step 204b), generating an initial value for each validity status (step 204c), for example "valid", and generating an initial value for each effectiveness score, for example "0". Identifying the lightpaths that travel through the DCM location involves using the network topology table 30 to determine which lightpaths 32 are laid over (i.e. on the same row as) the fiber span 34 on which the DCM is located.

Figure 4:
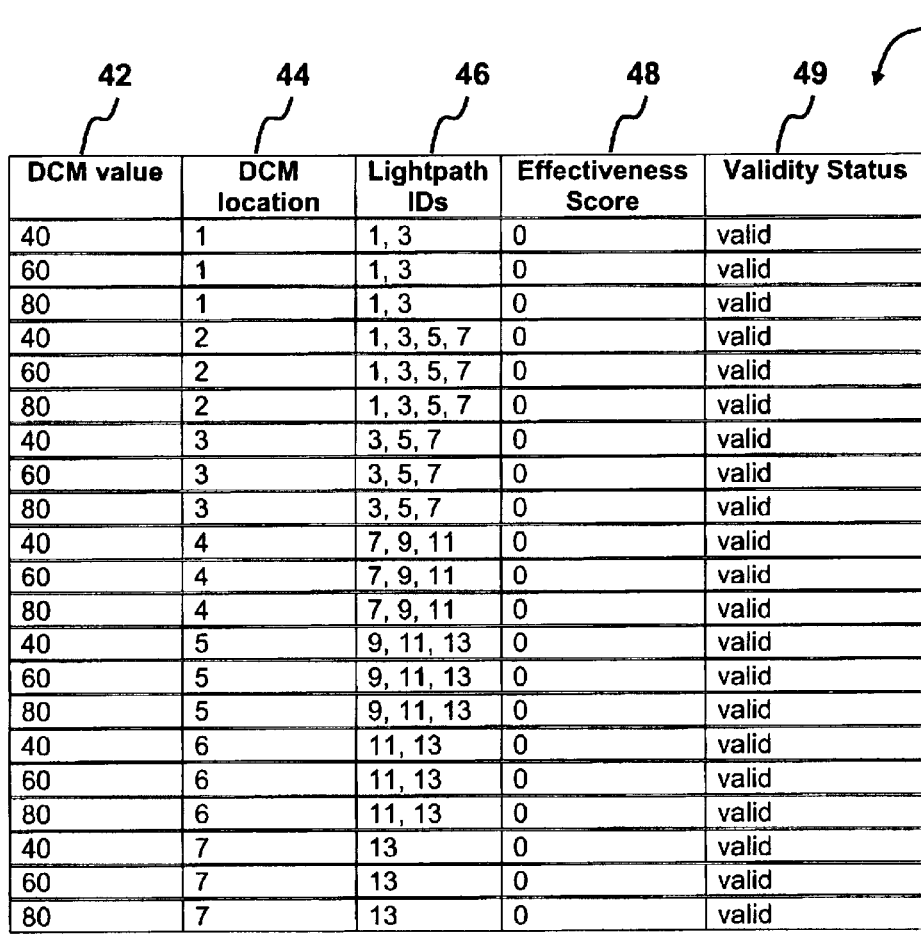
FIG. 4 shows a table of DCM calculation objects of the optical network of FIG. 1 determined in the step 204 of FIG. 2.

FIG. 4 shows a table 40 of DCM calculation objects of the optical network 10 of FIG. 1 determined in the step 204 of FIG. 2. Each row in the table 40 corresponds to a DCM calculation object. For example, the first row of the table 40 in FIG. 4 is a DCM calculation object for the DCM value 42 "40 km" and the location 44 fiber "1". The lightpaths passing through the fiber span "1" on which the DCM is located are identified as lightpaths "1" and "3" because in the light path topology table 30 of FIG. 3, the fiber span "1" is present in the first two rows, which correspond to lightpaths "AC" and "AD" having lightpath IDs "1" and "3". The validity status is initialized to the value "valid" and the effectiveness score is initialized to the value "0".

Following the step 204, the procedure 200 checks whether the effective dispersion of any of the lightpaths 16 is positive (step 206), indicating accumulated dispersion in the network 10 exceeding the maximum positive limit Pos_Disp_Limit of the dispersion. If effective dispersion is zero, i.e. not positive, (exit "No" from the step 206), then there is no need for DCMs to be placed in the optical network, and the method proceeds to the step 216 where a pass outcome is declared indicating that the optical network 10 meets dispersion specifications, and the DCM placement procedure 200 is finished (step 299). If effective dispersion is positive (exit "Yes" from the step 206), then there is a need for the placement of DCMs in the optical network and the procedure 200 proceeds to the step 208.

Figure 2C:
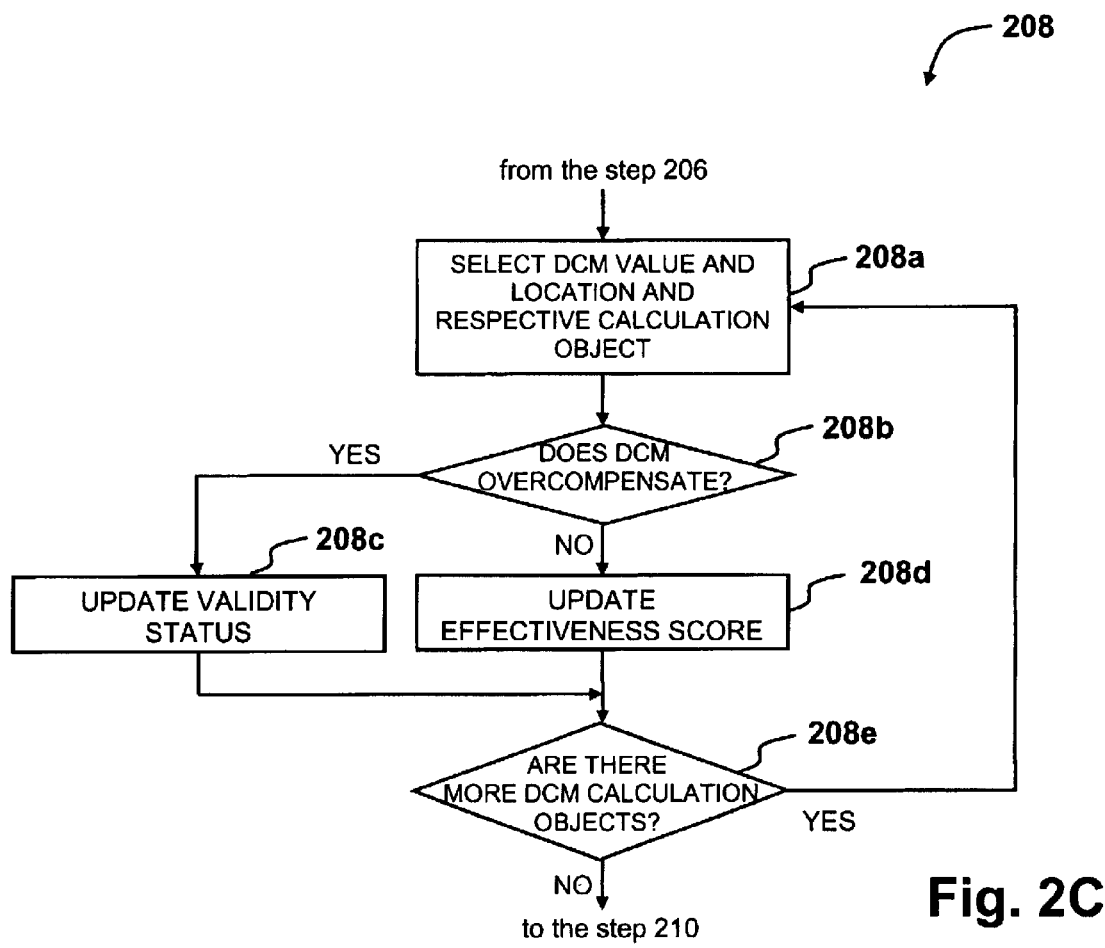
FIG. 2C is a flowchart illustrating the step 208 of re-calculating an effectiveness score in the method of FIG. 2 in more detail.

In the step 208, the effectiveness scores 48 are re-calculated, which comprises the steps shown in FIG. 2C of selecting a DCM value and location combination and respective calculation object (step 208a) and determining whether that DCM value and location combination causes over-compensation of dispersion on any lightpath (step 208b). If the DCM does cause over-compensation (exit "Yes" from step 208b), then the validity status 49 of the DCM calculation object is updated to be "invalid" (step 208c) and the procedure 208 proceeds to the step 208e. If the DCM does not cause over compensation (exit "No" from step 208b), then the effectiveness score is updated (step 208d) by taking into account the values and locations of any DCMs that were selected in the step 212. Then the procedure 208 proceeds to the step 208e where a check is performed to determine whether there are any more DCM value and location combinations to select. If there are more DCM value and location combinations to select (exit "Yes" from the step 208e), then the procedure 208 returns to the step 208a and is repeated until all DCM value and location combinations are selected. If there are no more DCM value and location combinations to select (exit "No" from the step 208e), then the procedure proceeds to the step 210.

In the step 210, the validity status 49 of the DCM calculation objects 40 is checked to determine whether there are any valid DCM value and location combinations for the optical network 10. If there are no valid DCM value and location combinations (exit "No" from the step 210), i.e. the validity status for all DCM calculation objects 40 is "invalid", then the flow-chart 200 proceeds to the step 218 where a fail outcome is declared, indicating that the optical network 10 cannot meet dispersion specifications under the stipulated conditions, and the DCM placement procedure 200 is finished (step 299). If there are valid DCM value and location combinations (exit "Yes" from the step 210), then the method proceeds to the step 212.

In the step 212, the DCM value and location combination whose calculation object has a "valid" validity status and has the highest effectiveness score is selected. If more than one valid DCM calculation object has the same highest effectiveness score, another factor is used to select between them, for example, the value 42 of the DCM. The DCM with the lower value is selected to minimize cost of DCMs in the network 10.

The step 214 of recalculating effective dispersions follows next. In the step 214, the effective dispersions 36 of each of the lightpaths 16 are re-calculated by taking into account the dispersion compensation provided by the DCM selected in the step 212, and the procedure 200 returns to the step 206 to determine whether the recalculated effective dispersions are positive.

Thus, a method for determining the value and location of DCMs in an optical network is provided that is systematic, efficient, and may be applicable to a variety of network topologies.

This method may also be applied to bidirectional networks in which nodes are connected by two spans of fiber, each fiber span carrying a network signal traveling in opposite directions (i.e. one signal traveling clockwise and one signal traveling counterclockwise). These two fiber spans between nodes may be of different lengths, so that the DCM placement method must be performed twice, once on the network that carries signals traveling clockwise, and once on the network that carries signals traveling counterclockwise.

Furthermore, this method may be applied to protected networks having additional fiber spans forming protection lightpaths between nodes, and to reconfigurable networks having multiple reconfigurable lightpaths between nodes. In the step 202a of identifying all lightpaths in the network, the protection lightpaths and the reconfigurable lightpaths are identified along with the working lightpaths. Thus the method ensures that all lightpaths, including the protected lightpaths and reconfigurable lightpaths, meet dispersion specifications.

In a modification to the method of the first embodiment, the step 515 is applied before the step 216 as illustrated in FIG. 2. In this step 515, alternative fiber spans for the DCM location are determined such that the transfer of the DCM to the alternative fiber span does not change the accumulated dispersion of any lightpath 16 in the network 10.

Figure 5:
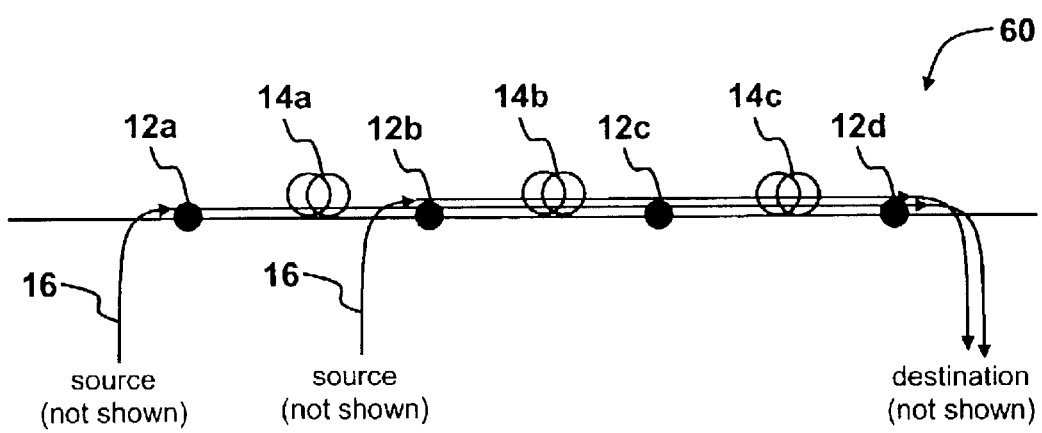
FIG. 5 shows an exemplary portion of an optical network used for illustrating a method for determining the placement and value of DCMs according to a modification to the first embodiment of the invention.

A method for determining the alternative fiber spans is illustrated with the aid of FIG. 5. FIG. 5 illustrates an exemplary portion of an optical network 60 comprising nodes 12a, 12b, 12c, and 12d, which were collectively labeled as 12 in FIG. 1, connected by fiber spans 14a, 14b, and 14c, which were collectively labeled as 14 in FIG. 1. The node 12c is neither source nor destination for any lightpath 16. The fiber spans 14b and 14c immediately surround the node 12c, and the transfer of a DCM from one of these fiber spans to the other of these fiber spans does not change the accumulated dispersion of any lightpath 16 in the portion of the network 60 because the lightpaths 16 similarly pass through the DCM whether it is located on fiber span 14b or 14c. Thus the fiber span 14c is an alternative to the fiber span 14b and vice versa. In general, the method for determining the alternative fiber spans is to identify fiber spans that immediately surround nodes that are neither source nor destination for any lightpath 16 in the network 10.

Thus, a method for determining the value and location of DCMs in an optical network is provided that is more flexible by determining alternative locations of DCMs.

In another modification to the method of the first embodiment, the step 208 of re-calculating the effectiveness scores is modified to take into account a dispersion slope mismatch between the fiber spans 14 and the DCMs in the optical network 10. To prevent over-compensation and under-compensation of dispersion on different lightpaths, the maximum compensated effective dispersion over all wavelengths in the network is used to determine whether the DCM will cause over-compensation on any lightpath 16 in the network, and the minimum compensated effective dispersion over all wavelengths in the network is used to calculate the effectiveness scores of each DCM calculation object.

Thus, a method for determining the value and location of DCMs in an optical network is provided that takes into account the dispersion slope mismatch between the fiber spans and the DCMs in the network.

According to a second embodiment of the invention, the procedure 200 of FIG. 2 is repeated a number of times, and the step 212 of selecting the DCM location and value combination does not comprise selecting the combination whose calculation object has the highest effectiveness score, but selecting the combination whose calculation object is chosen from a subset of the DCM calculation objects in the network.

The total number and the values of the DCMs provided by the repeated execution of the procedure 200 are then compared, and the method that provides the least number of DCMs and the lowest values of DCMs in the network is selected.

The subset of DCM calculation objects of the step 212 of the second embodiment of the invention may be a fraction, for example half, of all DCM calculation objects. Beneficially, the subset of DCM calculation objects may be the half of all DCM calculation objects that have the highest effectiveness scores. Furthermore, it would reduce processing time to compare the total number of selected DCMs with that of previously executed methods immediately after the step 212 of selecting a DCM so that as soon the number of selected DCMs exceeds that of a previously executed method, the currently executing method may be terminated because it will not minimize the total number of DCMS. It would also reduce processing time to store all calculated values, such as effective dispersions 36 and effectiveness scores 48, rather than update them in the steps 206 to 214, so that the values may be reused when repeating the procedure 200.

Thus, a method for determining the value and location of DCMs in an optical network is provided which may produce a solution having fewer number of DCMs or DCMs with lower values.

It is apparent to those skilled in the art that there are many variations of the present invention that retain the spirit of the invention. Thus it is intended that the present invention cover the modifications, variations, and adaptations of this invention provided they fall within the scope of the following claims.

What is claimed is:

1. A method for determining the location and value of one or more dispersion compensating modules (DCMs) in an optical network, comprising the steps of:

(a) determining a lightpath topology in the network;

(b) determining an effective dispersion on each of the lightpaths in the network, the effective dispersion being an amount of dispersion accumulated along the lightpath which exceeds the maximum positive dispersion value Pos_Disp_Limit specified for the network;

(c) if the effective dispersion is positive, calculating an effectiveness score for each combination of a DCM value and location in the network, the effectiveness score being a measure of dispersion compensation by the DCM over one or more lightpaths that pass through the DCM;

(d) selecting the DCM location and value combination based on said effectiveness scores; and (e) repeating the steps (b) to (d) until the effective dispersion in the network is substantially zero.

2. A method as described in claim 1, wherein the step of determining the lightpath topology comprises:

identifying lightpaths in the network;

assigning lightpath identification numbers (lightpath IDs) to the lightpaths;

identifying fiber spans over which the lightpaths are laid.

3. A method as described in claim 2, wherein the step of determining the lightpath topology comprises identifying all lightpaths in the network including protection lightpaths and reconfigurable lightpaths.

4. A method as described in claim 1, further comprising the step of introducing a DCM calculation object and initializing the values thereof for each combination of a DCM value and location, the calculation object including the following components:

lightpath identification numbers (lightpath IDs) of lightpaths that pass through the DCM;

a validity status, indicating the permission for placing the DCM in the specified location in the network;

an effectiveness score, providing a measure of dispersion compensation by the DCM over one or more lightpaths that pass through the DCM.

5. A method as described in claim 4, wherein the step of calculating the effectiveness score comprises:

(i) selecting the DCM calculation object;

(ii) verifying if the accumulated dispersion along a lightpath that passes through the DCM is above the maximum negative dispersion value Neg_Disp_Limit specified for the network;

(iii) if no, updating the validity status to be "invalid";

(iv) if yes, updating the effectiveness score by taking into account the values and locations of the selected DCMs; and (v) repeating the steps (i) to (iv) until all DCM calculation objects are selected.

6. A method as described in claim 4, wherein the step of introducing the DCM calculation object comprises defining the validity status as a Boolean variable having values of "valid" and "invalid" and indicating permission for placing the DCM in the specified location in the network, the Boolean variable being "valid" if the accumulated dispersion along each of the lightpaths passing through the DCM is above the maximum negative dispersion value Neg_Disp_Limit specified for the network.

7. A method as described in claim 4, wherein the step of introducing the DCM calculation object comprises defining the validity status as the number of remaining DCMs permitted to be placed at the DCM location.

8. A method as described in claim 1, wherein the step (c) of calculating the effectiveness score comprises summing the effectiveness scores of each lightpath that passes through the DCM, wherein the effectiveness score for a lightpath is equal to:

the effective dispersion on the lightpath, if the effective dispersion is less than the DCM value; and the DCM value, if the effective dispersion on the lightpath is greater than the DCM value.

9. A method as described in claim 1, wherein the step (d) of selecting the DCM location and value combination comprises selecting the DCM location and value combination whose DCM calculation object has the highest effectiveness score.

10. A method as described in claim 1, wherein the step (b) of determining the effective dispersion comprises measuring the effective dispersion in units of distance.

11. A method as described in claim 1 wherein the step (c) of calculating the effectiveness score comprises calculating the effectiveness score by taking into account a dispersion slope mismatch between the dispersion of fiber spans in the network and the dispersion of the DCM.

12. A method as described in claim 11, wherein the step of calculating the effectiveness score by taking into account a dispersion slope mismatch comprises calculating the effectiveness score as equal to the minimum compensated dispersion over all wavelengths for lightpaths that pass through the DCM.

13. A method as described in claim 1, wherein the step (d) of selecting the DCM location and value combination further comprises determining alternative DCM locations such that the transfer of the DCM to the alternative location does not change the accumulated dispersion along any lightpath in the network.

14. A method for determining the location and value of one or more dispersion compensating modules (DCMs) in an optical network, comprising the steps of:

(g) executing the method as described in claim 1, wherein the step (d) of selecting the DCM location and value combination comprises selecting the DCM location and value combination whose DCM calculation object is chosen from the DCM calculation objects in the network;

(h) repeating the step (g) required number of times; and (k) comparing the total numbers and values of DCMs provided by methods executed in steps (g) to (h); and (l) choosing the method among methods executed in steps (g) to (h) that provides the least number of DCMs and the lowest value of DCMs in the network.

15. A method as described in claim 14, wherein the step (h) comprises repeating the step (g) for the DCM calculation object, which has the highest effectiveness score.

16. A method as described in claim 14, wherein the step (g) of executing the method comprises selecting the DCM location and value combination whose DCM calculation object is chosen from a subset of the DCM calculation objects.

17. A method as claimed in claim 16, wherein the step of executing the method comprises defining the subset of DCM calculation objects as the subset with the highest effectiveness scores.

18. A method as claimed in claim 14, wherein the step (d) of selecting the DCM value and location combination further comprises verifying that the total number of selected DCM value and location combinations is less than that of previous executions of the step (g), otherwise terminating the execution of the step (g).

19. A method as claimed in claim 14, further comprising saving all calculated values.

20. A system for determining the location and value of one or more dispersion compensating modules (DCMs) in an optical network, comprising:

(a) means for determining a lightpath topology in the network;

(b) means for determining an effective dispersion on each of the lightpaths in the network, the effective dispersion being an amount of dispersion accumulated along the lightpath, which exceeds the maximum positive dispersion value Pos_Disp_Limit specified for the network;

(c) means for calculating an effectiveness score for each combination of a DCM value and location in the network if the effective dispersion is positive, the effectiveness score being a measure of dispersion compensation by the DCM over one or more lightpaths that pass through the DCM;

(d) means for selecting the DCM location and value combination based on said effectiveness scores; and (e) means for checking that the effective dispersion in the network is substantially zero.

21. A system as described in claim 20, wherein the means (d) for selecting the DCM location and value combination comprises means for selecting the DCM location and value combination whose DCM calculation object has the highest effectiveness score.

22. A system as described in claim 20, wherein the means (c) for calculating the effectiveness score comprises means for calculating the effectiveness score that takes into account a dispersion slope mismatch between the dispersion of fiber spans in the network and the dispersion of the DCM.

23. A system as described in claim 20, wherein the means (d) for selecting the DCM location and value combination further comprises means for determining alternative DCM locations such that the transfer of the DCM to the alternative location does not change the accumulated dispersion along any lightpath in the network.

* * * * *